United States Patent [19]

Zieke et al.

[11] Patent Number: 4,741,789
[45] Date of Patent: May 3, 1988

[54] APPARATUS AND PROCESS FOR FORMING AND APPLYING A PROFILE AND ADJACENT RIB-TYPE ZIPPER TO A TRAVELING FILM WEB

[75] Inventors: Larry Zieke, Midland; James Trombley, Bentley, both of Mich.

[73] Assignee: The Dow Chemical Company, Midland, Mich.

[21] Appl. No.: 921,023

[22] Filed: Oct. 20, 1986

[51] Int. Cl.[4] .......................................... B29C 47/04
[52] U.S. Cl. ..................... 156/66; 156/244.11; 156/244.25; 156/244.27; 156/500; 383/63; 383/65
[58] Field of Search ............... 156/66, 244.11, 244.25, 156/244.27, 500; 264/146; 24/30.5 R, 30.5 L, 572, 580, 588; 383/63, 65

[56] References Cited

U.S. PATENT DOCUMENTS

| | | | |
|---|---|---|---|
| 3,008,862 | 11/1961 | Haine et al. | 156/244.11 |
| 3,034,941 | 5/1962 | Hessenthaler et al. | 156/244.11 |
| 3,198,228 | 8/1965 | Naito | 383/63 |
| 3,226,787 | 1/1966 | Ausnit | 383/63 |
| 3,338,284 | 8/1967 | Ausnit | 383/63 |
| 3,462,332 | 8/1969 | Goto | 156/244.11 |
| 3,540,975 | 11/1970 | Wright et al. | 156/244.11 |
| 4,101,355 | 7/1978 | Ausnit | 156/244.27 |
| 4,259,133 | 3/1981 | Yagi | 156/244.11 |
| 4,263,079 | 4/1981 | Sutrina et al. | 156/244.11 |
| 4,363,345 | 12/1982 | Scheibner | 383/63 |
| 4,419,159 | 12/1983 | Herrington | 156/66 |
| 4,428,788 | 1/1984 | Kamp | 156/66 |
| 4,484,352 | 11/1984 | Katzin | 383/65 |
| 4,540,537 | 9/1985 | Kamp | 264/171 |
| 4,562,027 | 12/1985 | Behr et al. | 264/146 |

Primary Examiner—Caleb Weston

[57] ABSTRACT

A method and apparatus are provided for applying a profile with adjacent ribs to a traveling film web to form an adjacent rib-type zipper. The device includes a first extruder for extruding a base member, and a mechanism for joining the base member to a bag film web. A second extruder is provided for extruding a male profile member, a first rib member and a second rib member as three separate extrudates. The extruder is configured for joining the profile member, first rib member and second rib member to the bag film in an aligned relation such that the profile member is disposed between the first and second rib members.

25 Claims, 2 Drawing Sheets

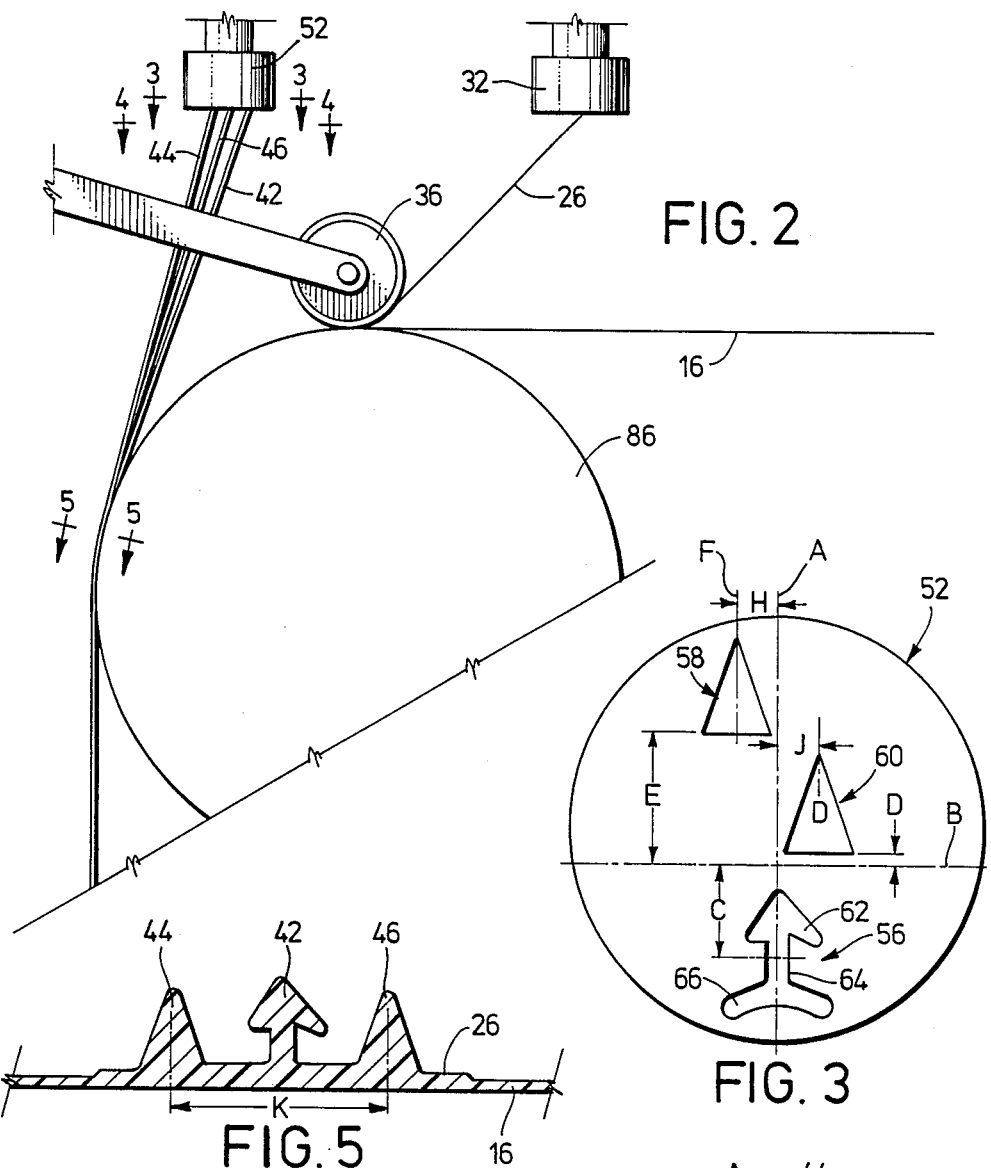
FIG. 2
FIG. 3
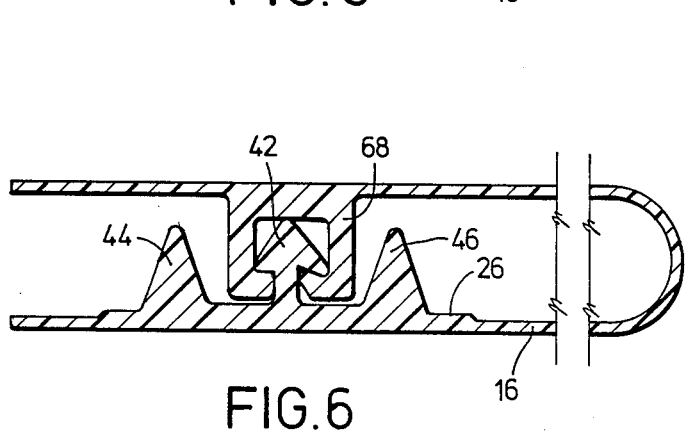
FIG. 5
FIG. 6
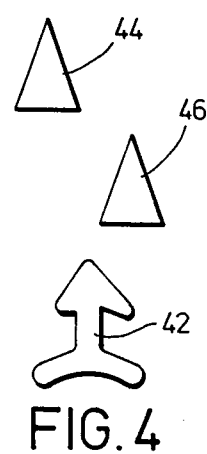
FIG. 4

APPARATUS AND PROCESS FOR FORMING AND APPLYING A PROFILE AND ADJACENT RIB-TYPE ZIPPER TO A TRAVELING FILM WEB

BACKGROUND OF THE INVENTION

The present invention relates to a process and an apparatus for producing a bag film web for use in the production of reclosable plastic bags, and more particularly, to a method and process for applying a zipper containing a profile with adjacent ribs to a traveling film web.

Reclosable plastic bags have been used in a wide variety of applications. Reclosable plastic bags are typically formed, sealed and cut to form a container having three closed sides, and one reclosable side. The reclosable side of the bag includes a male fastener element and a female fastener element which are placed in an opposed relation. The user can engage the male and female fastener elements to seal the bag, and can disengage the male and female elements to gain access to the interior of the bag.

A male fastener element typically consists of a male closure profile having a head which is shaped to be received by a cavity of a female closure profile. For example, Ausnit, U.S. Pat. No. 3,338,284 disloses a fastener element having an arrow-shaped head which is sized and shaped to be received by a mushroom-shaped cavity in a generally C-shaped female closure profile. Although closure elements of the type shown in the Ausnit patent can be manufactured to function quite well, room for improvement exists.

One improvement relates to the use of a fastener element wherein the male profile element is joined by a pair of adjacent ribs. This type of fastener element consists generally of a standard female closure profile which is used in conjunction with a modified male closure profile. The male closure profile is modified to include a first rib member which is disposed on one side of the closure profile, and a second rib member which is disposed on the other side of the closure profile. Both the first and second rib members extend in a generally parallel, spaced relation to the male closure profile. The rib members improve the operation of the zipper by stiffening the area of the bag film around the male closure profile member, thereby helping the user to align and engage the male and female closure profile members. Additionally, it is believed that the rib members better distribute the closing force exerted by the user over a greater area of the bag film, thus making the user feel as though the male and female closure members are easier to engage.

Conventionally, this type of zipper is formed by extruding the male closure profile and rib members integrally with the extrusion of the bag film web. Although this integral extrusion process can function quite well in forming a fastener having rib adjacent to the profile member, it has some drawbacks. The primary drawback of the integral extrusion process is that it limits the manufacturer's flexibility in the production of reclosable bag film webs. As the integral extrusion process requires that the bag film and closure member be formed at the same time, the manufacturer cannot use the integral extrusion process to place a closure member onto an existing bag film web. The flexibility to place a closure member onto an existing bag film web is often desirable in prototype applications, low volume applications, specialty applications, and applications wherein the purchaser desires to purchase his bag film material from one source, and his closure members from a second source.

To overcome this lack of flexibility, it would be helpful to be able to form the closure member separately from the formation of the bag film web, and to join the closure member to the bag film web thereafter.

One method of applying a rib containing closure member to a preformed bag film web is to extrude a base member, a closure profile, a first rib member and a second rib member together as a unitary extrudate. The underside surface of the base portion of the resulting unitary extrudate is then joined to a traveling bag film web. Although this method has been utilized successfully in some applications, in other applications air has become entrapped between the rather wide base and the underlying film web. This can result in poor adherence of the closure member to the web and less than satisfactory operation of the zipper in use.

Accordingly, it is an object of the present invention to provide a method for forming the closure profile and rib members of a zipper as separate extrudates and then joining them to a traveling bag film web.

SUMMARY OF THE INVENTION

In accordance with the present invention, a method is provided for applying a zipper with associated rib members to a traveling web which includes providng a bag film web, and extruding a profile member, a first rib member, and a second rib member as three separate extrudates. The profile member, first rib member and second rib member are joined to the bag film web in an aligned relation such that the profile member is disposed between the first and second rib members.

The method may also include the steps of extruding a generally planar base member and joining the base member to the bag film web before the profile and rib members are joined to the bag film web.

Additionally, an extrusion means is provided for extruding the profile member, first rib member, and second rib member of the present invention. The extrusion means includes means for heating and feeding the material to be extruded, and an extrusion die. The extrusion die has a profile die slot through which the profile member is extruded, a first rib member die slot through which the first rib member is extruded, and a second rib member die slot through which the second rib member is extruded. The profile die slot, first rib member die slot and second rib member die slot are configured to extrude the profile member, first rib member and second rib member as three separate extrudates, and to deliver the profile member, first rib member and second rib member to the bag film web in an aligned relation such that the profile member is disposed between the first and second rib members.

In a preferred embodiment, the profile die slot is vertically offset from the first and second rib member die slots, and the first and second rib members die slots are vertically offset from each other.

One feature of the present invention is that it permits the profile member and ribs to be formed separately from the bag film web. This feature has the advantage of providing a manufacturer with greater flexibility in his choice of materials. Thus, the choice of material for use in the bag film web is not constrained by material requirements imposed by the closure member. Further, this feature has the advantage of providing the manufacturer with greater flexibility in his decision of when to join the closure profile member to the bag film web. The manufacturer is not limited to joining the closure member to the bag film during the formation of the bag film, but rather can join the closure member of the instant invention to a preformed bag film web.

It is also a feature of the present invention that the extrusion of the profile member and rib members as separate extrudates facilitates the engagement of the profile and rib members to the bag film without the formation of air pockets therebetween. This facilitated engagement helps to produce a good bond between the bag film web and the profile and rib members, thus producing an aesthetically pleasing, proper functioning reclosable bag.

A further feature of a preferred embodiment of the present invention is that an extrusion die is provided which includes three, vertically offset die slots through which the profile member, first rib member and second rib member can be extruded as separate extrudates. This vertically offset arrangement provides for the proper alignment and spatial separation of the profile and rib members on the bag film web. This proper alignment can be achieved without forcing the manufacturer to reduce the size of the profiles or rib members, and while avoiding any "blend in" problems between the profile and rib members. "Blend in" is a condition resulting from an inadequate spacing between the profile and rib members which causes the sides of the profile and rib members to become fused together after the members emerge from their die slots.

Additional features and advantages of the present invention will become apparent to those skilled in the art upon consideration of the following detailed description of the preferred embodiments exemplifying the best mode of carrying out the invention as presently perceived.

BRIEF DESCRIPTION OF THE DRAWINGS

FIG. 2 is a side view of the forming and joining station of the present invention;

FIG. 3 is an enlarged sectional view taken along lines 3—3 of FIG. 2;

FIG. 4 is an enlarged, sectional view taken along liens 4—4 of FIG. 2;

FIG. 5 is an enlarged, sectional view taken along lines 5—5 of FIG. 2;

FIG. 6 is a sectional view of the bag film web of the present invention showing the male and female closure profiles in an engaged position;

FIG. 7 is a sectional view of an alternate embodiment fastener element extrusion die; and FIG. 8 is a sectional view, illustrating the male fastener element produced from the die of FIG. 7 being engaged with a female fastener element.

DETAILED DESCRIPTION OF THE PREFERRED EMBODIMENTS

Figure 1:
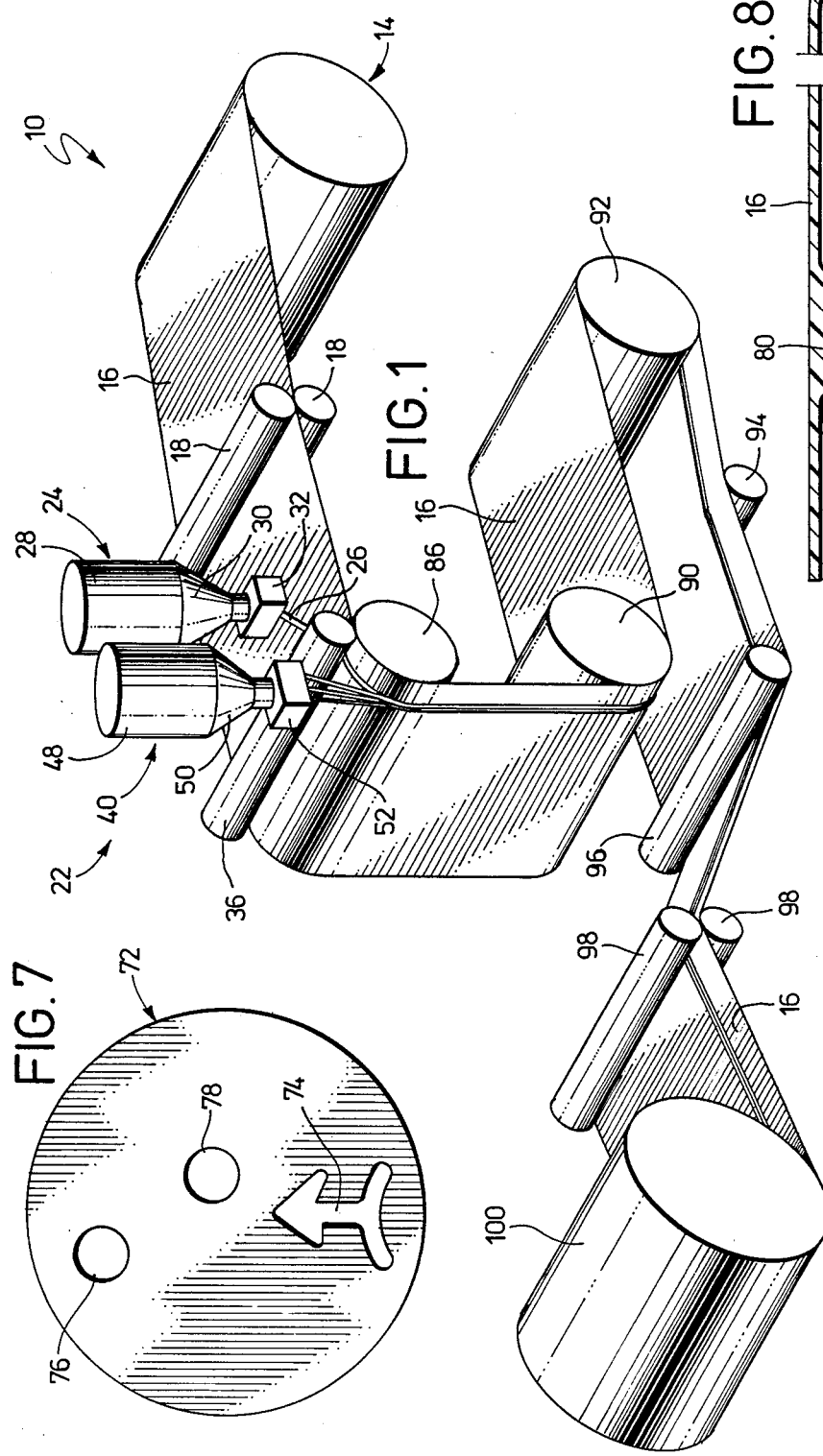
FIG. 1 is a perspective, schematic view of the apparatus of the present invention.

An apppartus 10 is provided for forming a closure member and joining the closure member to a traveling bag film as shown in FIG. 1. The apparatus 10 includes a roll 14 from which a web of bag film 16 is drawn. The bag film 16 typically is thin (e.g. 0.001–0.003 inches thick), and generally has a constant thickness throughout its width. The bag film 16 can comprise a single layer of material, or a laminate consisting of two or more layers of material. A wide variety of polymeric materials can be used in the bag film 16, with one of the more popular being high density polyethylene.

After emerging from the roll 14, the bag film 16 is drawn through a pair of idler rollers 18 for properly positioning the bag film. Alternately, drive rollers (not shown) can be used in place of idler rollers 18.

The bag film web 16 is then drawn into a forming and joining station 22. forming and joining station 22 includes a first extrusion means 24 includes a hopper 28 for receiving a plastic material, a body 30 which contains a heating means (not shown) for heating the plastic material into a molten state, and a screw auger (not shown) for advancing the molten material to and through a die block 32. The die block 32 includes a die slot (not shown) which has a generally strap-like cross sectional shape for extruding a generally strap-shaped base member 26. The base member 26 so extruded is preferably between about 0.002 and 0.003 inches thick, and approximately 0.375 inches wide.

The relative thickness of the base member 26 permits the base member 26 to serve as the heat sink, and to retain a considerable amount of residual heat after its extrusion. This retained residual heat helps to promote the fusion of the base member 26 to the bag film web 16, and also helps promote the fusion of the profile and rib members to the base member 26, and hence to bag film 16.

A polytetrafluorethylene coated lay on roller 36 is provided for applying the base member 26 to the bag film web 16 by pressing the base member 26 into engagement with the bag film web 16, as best shown in FIG. 2. By pressing the base member 26 into engagement with the bag film web 16, the lay on roller 36 facilitates the bonding of the base member 26 to the bag film 16 by driving out air pockets which might form between the underside surface of the base member 26 and bag film 16. The removal of these air pockets helps to ensure the formation of a good bond between the base member 26 and bag film web 16.

A second extrusion means 40 is provided for extruding a male profile member 42, a first rib member 44 and a second rib member 46, which form the three primary components of the male portion of the fastener of the instant invention. The second extrusion means 40 includes a hopper 48 and a body 50 which are similar in structure and function to the hopper 28 and body 30 of first extrusion means 24.

Referring now to FIGS. 3–5, the second extrusion means includes a die block 52. Die block 52 includes a profile member die slot 56, a first rib member die slot 58, and a second rib member die slot 60, through which the profile member 42, first rib member 44, and second rib member 46, respectively, are extruded as three separate extrudates. The profile member die slot 56 is typically arrow-shaped in cross section and includes an arrowhead-shaped head portion 62, a shaft portion 64, and a generally arcuate tail portion 66, to yield a profile member 42 having a similarly shaped head, shaft and tail portions. Other male profiles may also be utilized. The first and second rib member die slots 58, 60 may be shaped similarly to each other. For example, as shown, both die slots 58, 60 comprise isosceles triangles in cross section. For example, each rib member die slot 58, 60 can have a pair of 70° base angles and a 40° apex angle. The rib member die slots 58, 60 are vertically offset from each other, and are each vertically offset from the profile member die slot 56. Additionally, the rib member die slots 58, 60 are offset laterally from each other.

To illustrate the degree to which the three die slots 56, 68, 60 are vertically and laterially offset, the following example is provided which is illustrative of the relative size and spacing of the three die slots 56, 58, 60. This example is not intended to be limiting. other dimensions and spacings may be utilized depending upon the desired size and spacing of the elements for a given application. The dimensions set forth in the following example are given relative to an imaginary longitudinal bisector A which bisects the profile die slot 56, and an imaginary latitudinal bisector B.

With respect to the vertical spacing, the distance C between the center of the profile die slot 56, and the latitudinal bisector B is 0.250 inches. The distance D between the base of the second rib member die slot 60 and the latitudinal bisector B is 0.035 inches. The distance E between the base of the first rib member die slot 58 and the latitudinal bisector B is 0.290 inches. As the height of each isosceles triangle-shaped rib member die slot 58, 60 is 0.192 inches, the vertical spacing between the apex of the second rib member die slot 60 and the base of the first rib member die slot 58 is 0.063 inches.

With respect to horizontal spacing, the distance H between the apex of the first rib member die slot 58 and the longitudinal bisector A, and the distance J between the apex of the second rib member die slot 60 and the longitudinal bisector A are each 0.085 inches, thus yielding a horizontal spacing of 0.170 inches between the apices (and hence the vertical axes) of the first and second rib member die slots 58, 60.

This horizontal spacing between the rib member die slots 58, 60 is chosen to yield the proper spacing between the rib members 46, 48, when the rib members 46, 48 become joined to the bag film web 16. Applicants have found that the spacing between the apices of the first and second rib members 44, 46 should generally be between about 0.135 and 0.180 inches. Applicants have also found that the distance at which the rib members 44, 46 are spaced when they are applied to the bag film web 16 will correspond generally to the horizontal (lateral) spacing between the rib member die slots 58, 60. Thus, in the example given above, the 0.170 inch spacing between the first and second rib member die slots 58, 60 will result in a lateral spacing K of approximately 0.170 inches between the applied rib members 46, 48. Further, as the preferred lateral spacing between the first and second rib members is between about 0.135 and 0.180 inches, the preferred lateral spacing between the rib member die slots 58, 60 should be between about 0.135 and 0.180 inches.

By vertically offsetting the profile die slot 56 and the rib member die slots 58, 60, proper spacing can be achieved between the profile member 42 and the rib members 44, 46. It has been found that positioning die slots 56, 58 and 60 to be horizontally offset to provide the proper spacing, but not vertically offset produces results which are not totally satisfactory. It was found that if the rib member die slots were placed close enough to the profile die slot to properly space the rib members when applied to the bag film, the rib members so extruded have a tendency to "blend in" with the profile member. This blending in takes place just after the extrudates emerge from the die slot, and is a condition wherein the sides of the rib members become fused to the sides of the profile member. This creates an unsatisfactory fastener.

To alleviate this blending in problem, the size of the rib members may be reduced. However, although the proper spacing is maintained between the rib members, the smaller size of the rib members increases the space between each of the rib members and the profile member. Although the use of smaller rib members helps to prevent the profile member from blending in with the rib members, the reduced size of the rib members reduced the ability of the rib members to stiffen the area of the bag film adjacent to the profile member. Thus, the effectiveness of the zipper is reduced.

Applicants have found that the vertically offset configuration of the die slots 56, 58, 60 shown in FIG. 3 permits properly sized rib members to be extruded without becoming plended in with the profile member 42, and while still preserving the proper spatial alignment between the first and second rib members 44, 46 and the profile member 42 when the profile and rib members 42, 44, 46 are applied to the bag film web 16. As illustrated in FIG. 6, the rib members 44, 46 should be spaced far enough apart to permit the prongs of the female closure member 68 to be inserted interiorly of the rib members 44, 46 and exteriorly of the profile member 42, while being sufficiently close together to stiffen the area of the bag film 16 adjacent to the profile member 42.

An alternate embodiment die block 72 is shown in FIG. 7. Die block 72 includes a profile die slot 74, a first rib member die slot 76, and a second rib member die slot 78, through which a male profile member 80, first rib member 82, and a second rib member 84, respectively, are extruded as separate extrudates. Preferably, the position, size and shape of profile die slot 74 is similar to profile die slot 56. Although first and second rib member die slots 76, 78 have a generally circular cross section, and thus differ from the rib member die slots 58, 60, the relative placement of the respective first rib members die slots 58, 76 and second rib members die slots 60, 78 is similar for both die blocks 52, 72. As shown in FIG. 8, the fastener formed from the profile and rib members 74, 76 and 78 extruded from die block 72 is similar to the zipper formed from the extrudates of die block 52, escept insofar as the cross sectional shape of the rib members 82, 84 and 44, 46 differs. Rib members 82, 84, having a circular cross-section are preferred in some applications because triangular rib members 44, 46 can rotate during their travel from the die block 52 to the bag film 16, thus causing one or both of the rib members 44, 46 to engage the bag film 16 in a "tipped over" position. In a tipped over position, one of the side legs of the rib members 44, 46 engages the upper surface of the base member 26, rather than the base leg of the rib member 44, 46 engaging the upper surface.

Referring now to FIGS. 1 and 2, the base member 26 is joined to the bag film 16, and the profile 42 and rib members 44, 46 are joined to the upper surface of the base member 26 on a lamination roll 86. Due to the ability of the base member 26 to retain residual heat, and due to the short distance (and hence time) between the point at which the base member 26 is joined to the bag film web 16, and the point at which the profile and rib members 42, 44, 46 are joined to the base member, it will be appreciated that the closure profile 42 and rib members 44, 46 will become joined to the base member 26 before the base member 26 has cooled to an ambient temperature. The residual heat retained by the base member 26 fosters the fusion between the profile 42 and rib members 44, 46 and the base member 26. The lamination roll 86 serves the dual purpose of providing a backing support to facilitate the engagement of the base member 26, profile 42 and rib members 44, 46, and also serves to cool, and thereby solidify and bond the base member 26, profile 42 and rib members 44, 46 to each other and to the bag film web 16.

After passing around lamination roll 86, the closure member containing bag film web 16 travels past a pair of water jets (not shown) and around idler rolls 90, 92. The water jets accelerate the cooling of the base member 26, profile 42 and rib members 44, 46 to further solidify and bond them to each other and to the bag film web 16, and to help cool the above components to an ambient temperature. The bag film web 16 then passes around a pair of idler rollers 94, 96 and through a pair of driver rollers 98. After passing through drive rollers 98, the bag film web 16 is wound onto takeup roll 100.

In the manner described above, it is possible to form a closure element having a profile member 42, and a pair of aligned rib members 44, 46, and to apply the closure element onto a bag film web 16. It has been found by applicants that the system described above provides an efficient and flexible means for applying a this type of closure element to a bag film for use in the manufacture of reclosable plastic bags. While not forming a part of the present invention, it will be apparent to those skilled in the art that a female profile may be extruded and lamintated to the film web at the same time as the male profile and rib members are laminated to provide a film web which is ready to be folded, side-sealed, and severed to form individual recloseable bags.

Having described the invention in detail and by reference to preferred embodiments thereof, it will be apparent that modifications and variations are possible without departing from the scope of the invention defined in the appended claims.

What is claimed is:

1. A method for applying a profile with adjacent ribs to a traveling film web comprising the steps of:
   providing a bag film web,
   extruding a closure profile member, a first rib member and a second rib member as three separate extrudates, and
   joining said closure profile member, first rib member and second rib member to said bag film web in an aligned relation such that said closure profile member is disposed between said first and second rib members.

2. The method of claim 1 further comprising the steps of:
   extruding a generally planar base member, and
   joining said base member to said bag film web prior to joining said closure profile and rib members to said base member.

3. The method of claim 2 wherein said step of joining said base member comprises the step of pressing said base member into engagement with said bag film web with a roller.

4. The method of claim 3 wherein said roller comprises a polytetrafluorethylene coated roller.

5. The method of claim 2 wherein said profile member, first rib member and second rib members are joined to said base member after said base member has been joined to said bag film web and before said base member has cooled to an ambient temperature.

6. The method of claim 1 wherein said closure profile member, first rib member and second rib member are extruded through an extrusion die having a profile die slot through which said closure profile member is extruded, a first rib member die slot through which said first rib member is extruded and a second rib member die slot through which said second rib member is extruded.

7. The method of claim 1 wherein said step of extruding a closure profile member, first rib member and second rib member comprises the step of extruding a male profile member having, in cross-section, an arrow shaped head portion, a shaft portion and arcuate base portion, and
   extruding first and second rib members having, in cross-section, a generally triangular shape.

8. The method of claim 7 wherein said step of extruding a closure profile member, first rib member and second rib member comprises the step of extruding a male profile member having, in cross-section, an arrow shaped head portion, a shaft portion and an arcuate base portion, and
   extruding first and second rib members having, in cross-section, a generally circular shape.

9. The method of claim 1 wherein said first and second rib members are aligned on said bag film web at a distance from each other of between about 0.135 and 0.180 inches.

10. The method of claim 1, further comprising the steps of:
    extruding a generally planar base member before said closure profile and rib members are joined to said film web, and
    utilizing a roller to press said base member into engagement with said bag film web before said base member has cooled to an ambient temperature, and wherein
    said closure profile member, first rib member and second rib member are co-extruded through an extrusion die having a profile die slot through which said closure profile member is extruded, a first rib member die slot through which said first rib member is extruded and a second rib member die slot through which said second rib member is extruded, and
    said closure profile member, first rib member and second rib member are joined to said bag film web by joining said closure profile member, first rib member and second rib member to said base member before said base portion has cooled to an ambient temperature.

11. An extrusion means for extruding a closure profile member, a first rib member and a second rib member for a reclosable bag film web, the extrusion means including means for heating and feeding material to be extruded,
    an extrusion die having a profile die slot through which said closure profile member is extruded, a first rib member die slot through which said first rib member is extruded and a second rib member die slot through which said second rib member is extruded,
    said closure profile die slot, first rib member die slot and second rib member die slot being positioned to extrude said closure profile member, first rib member and second rib member as three separate extrudates, and deliver said closure profile member, first rib member and second rib member to said bag film web in an aligned relation such that said closure profile member is disposed between said first and second rib members.

12. Th extrusion means of claim 11 wherein said first and second rib member die slots are vertically offset from each other.

13. The extrusion means of claim 11 wherein said profile die slot is vertically offset from said first and second rib member die slots.

14. The extrusion means of claim 13 wherein first and second rib member die slots are vertically offset from each other.

15. The extrusion means of claim 14 wherein said profile die slot has a substantially vertical axis bisecting said die slot, with said first rib member die slot being disposed on one side of siad axis and said second rib member die slot being disposed on another side of said axis.

16. The extrusion means of claim 13 wherein said profile die slot includes a head portion, and at least one of said first and second rib member die slots are vertically offset from said head portion by a distance greater than the distance by which said at least one rib member die slot is laterally offset from said head portion.

17. The extrusion means of claim 13 wherein said first and second rib member die slots are offset laterally from each other by a distance of between about 0.130 and 0.180 inches.

18. The extrusion means of claim 11 wherein said first and second rib member die slots each have a generally triangular-shaped cross-section.

19. The extrusion means of claim 12 wherein said first and second rib member die slots each have a generally circular-shaped cross-section.

20. An appartus for applying a profile with adjacent ribs to a traveling film web comprising:

means for providing a bag film web, a first extrusion means for extruding a base member, joining means for joining said base member to said bag film web, a second extrusion means for extruding a closure profile member, a first rib member and a second rib member as three separate extrudates, said second extrusion means being configured for joining said closure profile member, first rib member and second rib member to said bag film web in an aligned relation such that said closure profile member is disposed between said first and second rib members.

21. The apparatus of claim 20 wherein said joining means comprises means for pressing said base member into engagement with said bag film web.

22. The apparatus of claim 20 wherein said second extrusion means includes an extrusion die having a profile die slot through which said closure profile member is extruded, a first rib member die slot through which said first rib member is extruded and a second rib member die slot through which said second rib member is extruded.

23. The apparatus of claim 22 wherein said profile die slot is vertically offset from at least one of said first and second rib member die slots.

24. The appartus of claim 22 wherein said first rib member die slot is vertically offset from said second rib member die slot.

25. The apparatus of claim 24 wherein said profile die slot is vertically offset from each of said first rib member die slot and said second rib member die slot.

* * * * *

UNITED STATES PATENT AND TRADEMARK OFFICE
CERTIFICATE OF CORRECTION

PATENT NO. : 4,741,789

DATED : May 3, 1988

INVENTOR(S) : Larry Zieke and James Trombley

It is certified that error appears in the above-identified patent and that said Letters Patent is hereby corrected as shown below:

Col. 1, line 15, following "formed" insert therefore --from a web of plastic film which is formed, folded--.

Col. 1, line 56, "rib" should read --ribs--.

Col. 2, line 29, "providng" should read --providing--.

Col. 3, line 61, "appartus" should read --apparatus--.

Col. 4, line 9, "forming" should read --Forming--.

Col. 4, line 10, following "means" insert therefore --for extruding a base member 26. The first extrusion means--.

Col. 4, line 23, "the heat" should read --a heat--.

UNITED STATES PATENT AND TRADEMARK OFFICE
CERTIFICATE OF CORRECTION

PATENT NO. : 4,741,789

DATED : May 3, 1988

INVENTOR(S) : Larry Zieke and James Trombley

It is certified that error appears in the above-identified patent and that said Letters Patent is hereby corrected as shown below:

Col. 5, line 4, "68" should read --58--.

Col. 6, line 15, "plended" should read --blended--.

Col. 6, line 37, "members" should read --member--. (both occurrences)

Col. 6, line 42, "escept" should read --except--.

Col. 7, line 15, "driver" should read --drive--.

Col. 7, line 27, "lamintated" should read --laminated--.

Col. 7, line 59, "polytetrafluorethylene" should read --polytetrafluoroethylene--.

Col. 9, line 1, "Th" should read --The--.

Col. 9, line 13, "siad" should read --said--.

Col. 9, line 32, "appartus" should read --apparatus--.

Signed and Sealed this

First Day of November, 1988

*Attest:*

DONALD J. QUIGG

*Attesting Officer*     *Commissioner of Patents and Trademarks*